US009274696B1

(12) United States Patent
Mierau et al.

(10) Patent No.: US 9,274,696 B1
(45) Date of Patent: Mar. 1, 2016

(54) SCROLL BAR WITH TIME DETAILS (71) Applicant: Path, Inc., San Francisco, CA (US)

(72) Inventors: Dustin R. Mierau, San Francisco, CA (US); Mallory Paine, San Jose, CA (US)

(73) Assignee: Path Mobile Inc Pte. Ltd., Singapore (SG)

( * ) Notice: Subject to any disclaimer, the term of this patent is extended or adjusted under 35 U.S.C. 154(b) by 288 days.

(21) Appl. No.: 13/923,620

(22) Filed: Jun. 21, 2013

Related U.S. Application Data (60) Provisional application No. 61/668,561, filed on Jul. 6, 2012.

(51) Int. Cl.
*G06F 3/048* (2013.01)
*G06F 3/0485* (2013.01)
G06F 3/0481 (2013.01)
G06F 3/0484 (2013.01)

(52) U.S. Cl.
CPC .......... *G06F 3/04855* (2013.01); *G06F 3/0485* (2013.01); *G06F 3/04817* (2013.01); *G06F 3/04847* (2013.01)

(58) Field of Classification Search
CPC ... G06F 3/0488; G06F 3/0481; G06F 3/0485; G06F 3/04855; G06F 3/04817; G06F 3/04847
See application file for complete search history.

(56) References Cited

U.S. PATENT DOCUMENTS

| | | | | |
|---|---|---|---|---|
| 5,532,715 A * | 7/1996 | Bates et al. | ................... | 345/684 |
| 6,597,378 B1 * | 7/2003 | Shiraishi et al. | .............. | 715/764 |
| 6,828,989 B2 * | 12/2004 | Cortright | ...................... | 715/769 |
| 7,523,412 B2 * | 4/2009 | Jones et al. | ................... | 715/787 |
| 8,429,534 B2 * | 4/2013 | Ishihara et al. | ................ | 715/736 |
| 8,509,854 B2 * | 8/2013 | Kim et al. | ..................... | 455/566 |
| 2005/0144560 A1 * | 6/2005 | Gruen et al. | .................. | 715/711 |
| 2005/0210403 A1 * | 9/2005 | Satanek | ........................ | 715/786 |
| 2006/0184901 A1 * | 8/2006 | Dietz | ............................ | 715/855 |
| 2006/0271870 A1 * | 11/2006 | Anwar | ........................... | 715/764 |
| 2012/0176370 A1 * | 7/2012 | Imai et al. | ..................... | 345/419 |

* cited by examiner

*Primary Examiner* — Dino Kujundzic
(74) *Attorney, Agent, or Firm* — Fenwick & West LLP (57) ABSTRACT

While a newsfeed is scrolled, an icon is displayed that includes the post time of a news story. The icon moves in a vertical direction as the newsfeed is scrolled and displays a post time of a news story when at least a predefined amount of the icon is displayed over the news story. Depending on when a news story was posted, the time icon may include the date the news story was posted. The icon may show a time and/or may include a clock showing time in analog or digital format. The newsfeed may be scrolled in response to a gesture by a user with a touch-sensitive display and the time icon may cease to be displayed once the user breaks contact with the touch-sensitive display.

20 Claims, 6 Drawing Sheets

SCROLL BAR WITH TIME DETAILS

CROSS-REFERENCE TO RELATED APPLICATIONS

This application claims the benefit of priority to U.S. Provisional Application Ser. No. 61/668,561 filed Jul. 6, 2012, which application is incorporated by reference herein in its entirety.

BACKGROUND

1. Field of Art

The disclosure generally relates generally to electronic devices with touch-sensitive surfaces, and more particularly, to electronic devices with touch-sensitive surfaces that display user interfaces.

2. Description of the Related Art

The user interface is integral to a user's overall experience with a portable device since the user interface is the gateway through which a user interacts with the device. Existing user interfaces are often complex and frustrating to use. For example, many user interfaces of mobile devices have complicated key sequences and menu hierarchies that must be memorized by the user. Accordingly, there is a need for more transparent and intuitive user interfaces for mobile devices that are easy to use, configure, and/or adapt.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Embodiments of the systems, methods and computer readable storage mediums disclosed herein provide an intuitive graphical user interface for use with application on a computing device. By way of example, in one embodiment the application is a social networking application, e.g., PATH, FACEBOOK, TWITTER, or GOOGLE+. Also by way of example, in one embodiment the computing device is a mobile device, e.g., a smartphone or tablet. Such graphical user interface efficiently uses screen space and reduces the cognitive burden on a user and produces a more efficient human-machine interface.

In one embodiment, while a newsfeed in a social media application is scrolled, an icon with time information is displayed along with the newsfeed. The icon may show a time and/or may include a clock showing time in analog or digital format. The time shown corresponds to the post time of a news story in the newsfeed. The time icon moves in a vertical direction as the newsfeed is scrolled and displays a post time of a news story when at least a predefined portion of the time icon is displayed over the news story. Depending on when a news story was posted, the time icon may include the date the news story was posted. The time icon may include an image of an analog clock that includes a clock face and clock hands. When the time icon displays a new time, the image of the clock maybe animated to show the clock hands moving to positions corresponding to the new time. The newsfeed may be scrolled in response to a gesture by a user with a touch sensitive display. In one example embodiment, the time icon may be displayed as long as the user maintains continuous contact with a touch sensitive display of the mobile computing device. In some embodiments, the news feed includes news stories from a social networking system. The news stories displayed in the feed do not include the times the stories were posted. This way, time icon provides helpful information while preserving valuable screen space.

When the newsfeed is scrolled, the time icon moves a distance in a vertical direction proportional to the amount that the newsfeed is scrolled. As a result, the location that the time icon is displayed at indicates the amount of the newsfeed that has been scrolled.

Computing Machine Architecture

Figure 1:
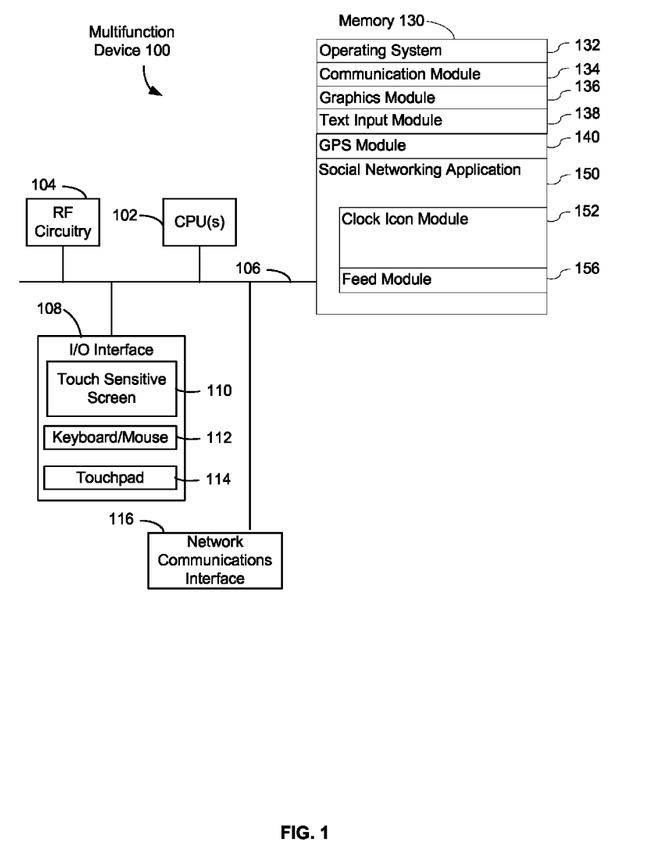
FIG. 1 illustrates one embodiment of components of an example machine able to read instructions from a machine-readable medium and execute them in a processor (or controller).

Referring now to FIG. 1, illustrated is a block diagram of an exemplary multifunction device 100 with a display and a touch-sensitive display in accordance with some embodiments. Specifically, FIG. 1 shows a diagrammatic representation of a machine in the example form of a multifunction device 100 within which instructions (e.g., software or program code executable by one or more processing units) for causing the machine to perform any one or more of the methodologies discussed herein may be executed. In some embodiments, the device 100 is a portable communications device such as a mobile telephone or tablet that also contains other functions, such as a music player functions. In some embodiments, the device 100 is a laptop computer, a desktop computer, a tablet computer, a multimedia player device, a navigation device, an educational device, a gaming system, or a control device (e.g., a home or industrial controller).

The device 100 typically includes one or more processing units 102, one or more network or other communications interfaces 116, memory 130, RF circuitry 104, and one or more communication buses 106 for interconnecting these components. The one or more processing units 102 may include a central processing unit, a graphics processing unit (GPU), a digital signal processor (DSP), one or more application specific integrated circuits (ASICs), or any combination of these. The communication buses 106 may include circuitry (sometimes called a chipset) that interconnects and controls communications between system components. The device 100 includes an input/output (I/O) interface 108 comprising a touch sensitive screen 110. The I/O interface 108 also may include a keyboard and/or mouse (or other pointing device) 112 and a touchpad 114. In some embodiments, the touchpad 114 is a touch-sensitive area of the device 100 that, unlike the touch sensitive screen 110, does not display visual output. The touchpad 114 may be a touch-sensitive surface that is separate from touch sensitive screen 110 or an extension of the touch-sensitive surface formed by the touch screen 110.

RF (radio frequency) circuitry 104 receives and sends electromagnetic signals, also called RF signals. RF circuitry 104 converts electrical signals to/from electromagnetic signals and communicates with communications networks and other communications devices via the electromagnetic signals. RF circuitry 104 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 104 may communicate with networks, such as the Internet, also referred to as the World Wide Web (WWW), an intranet and/or a wireless network, such as a cellular telephone network, a wireless local area network (LAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The touch sensitive screen 110 provides an input interface and an output interface between the device 100 and a user. The touch sensitive screen 110 displays visual output to the user. The visual output may include graphics, text, icons, video, and any combination thereof. The touch sensitive screen 110 has a touch-sensitive surface, sensor or set of sensors that accepts input from the user based on haptic and/or tactile contact. The touch sensitive screen 110 detects contact (and any movement or breaking of the contact) on the touch sensitive screen 110 and converts the detected contact into interaction with user-interface objects (e.g., one or more soft keys, icons, web pages or images) that are displayed on the touch sensitive screen 110. In an exemplary embodiment, a point of contact between touch sensitive screen 110 and the user corresponds to a finger of the user or a stylus used by the user.

The touch sensitive screen 110 may use LCD (liquid crystal display) technology, LPD (light emitting polymer display) technology, or LED (light emitting diode) technology, although other display technologies may be used in other embodiments. The touch sensitive screen 110 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch sensitive screen 110.

Memory 130 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 130 may optionally include one or more storage devices remotely located from the CPU(s) 102. Memory 130 includes a non-transitory machine-readable medium on which is stored instructions (e.g., software) embodying any one or more of the methodologies or functions described herein. The instructions (e.g., software or program code) may also reside, completely or at least partially, within the memory 130 or within the processing units 102 (e.g., within a processor's cache memory) during execution thereof by the device 100, the memory 130 and the processing unit 102 also constituting machine-readable media.

The term "machine-readable medium" should be taken to include a single medium or multiple media (e.g., a centralized or distributed database, or associated caches and servers) able to store instructions (e.g., instructions). The term "machine-readable medium" shall also be taken to include any medium that is capable of storing instructions (e.g., instructions) for execution by the machine and that cause the machine to perform any one or more of the methodologies disclosed herein. The term "machine-readable medium" includes, but not be limited to, data repositories in the form of solid-state memories, optical media, and magnetic media.

In some embodiments, memory 130 or the computer readable storage medium of memory 130 store the following programs, modules and data structures, or a subset thereof including operating system 132, communication module 134, graphics module 136, text input module 138, GPS module 140, and a social networking application 150.

The operating system 132 (e.g., APPLE iOS, GOOGLE ANDROID, Unix, RED HAT Linux, MICROSOFT WINDOWS, or an embedded operation system) includes various software components and/or drivers for controlling and managing general system tasks (e.g., memory management, storage device control, power management, etc.) and facilitates communication between various hardware and software components.

The communication module 134 facilitates communication with other devices via the one or more communication network interfaces 116 (wired or wireless) and one or more communication networks, such as the Internet, other wide area networks, local area networks, metropolitan area networks, cellular networks, and so on.

The graphics module 136 includes various known software components for rendering and displaying graphics on the touch sensitive screen 110 or other display. As used herein, the term "graphics" includes any object that can be displayed to a user, including without limitation text, web pages, icons (such as user-interface objects including soft keys), digital images, videos, animations, and the like.

The text input module 138 provides soft keyboards or on-screen keyboards for entering text in various contexts.

GPS module 140 determines the location of the device and provides this information for use in various modules or applications (e.g., the modules that provide location-based services such as map/navigation interfaces).

The social networking application 150 includes a time icon module 152 and a feed module 156. The social networking application 150 communicates with a social networking system in order to send and receive social content. A social networking system comprises one or more computing devices storing a social network. In one embodiment, the social network comprises a plurality of users interconnected by some predefined commonality or commonalities (e.g., social, business, interests, geography, educational, etc.). The social networkings system provides the users of the social network with the ability to communicate and interact with each other, often in connection with the predefined commonality.

Social networking systems allow users to explicitly associate themselves and establish connections with other users of the social networking system. When two users become connected, they are said to be "friends," "contacts," "connections," or "associates" within the context of the social networking system. Generally, being connected in a social networking system allows connected users access to more information about each other than would otherwise be available to unconnected users. Likewise, becoming connected within a social networking system may allow a user greater access to communicate with another user through a communicative interface (internal and external to the social networking system). Being connected may allow a user to access, to view, comment on, download or endorse another user's uploaded content items. The content items may include anything a user can add, upload, post, or send to the social networking system. Content may include textual data (e.g., comment message), location information, photos, videos, music, or other user-generated content.

Figure 2:
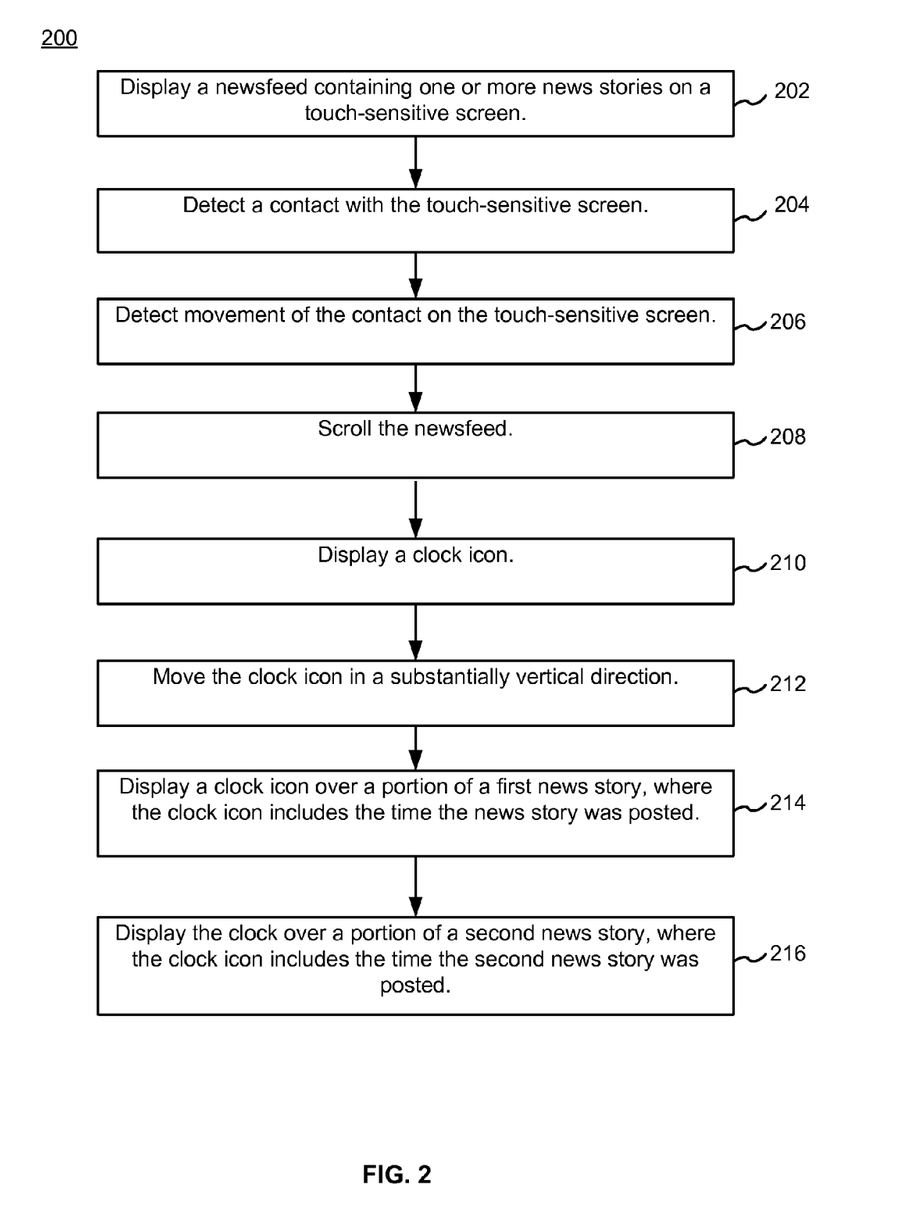
FIG. 2 is a flow chart illustrating a process for displaying scrolling a newsfeed and displaying times of news stories, in accordance with an example embodiment.

The time icon module 152 performs the operations discussed with respect to FIG. 2. The time icon module 152 generates a time icon that displays times of news stories and moves a distance in proportion to the amount of a newsfeed scrolled.

The feed module 156 receives a feed from a social networking system and displays the feed in the social networking application 150. The feed includes one or more new stories that describe activities of the users of the social networking system and/or include content posted by users of the social networking system.

Each of the above identified elements in FIG. 1 may be stored in one or more of the previously mentioned memory devices, e.g., memory 130. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 130 may store a subset of the modules and data structures identified above. Furthermore, memory 130 may store additional modules and data structures not described above.

Time Icon

Turning to FIG. 2, it illustrates a flow chart of a process 200 for displaying a time icon while scrolling through a newsfeed, in accordance with one embodiment. In one example embodiment, the timepiece icon is a time icon that shows an analog and/or digital clock face. The process 200 is performed at a multifunction device (e.g., multifunction device 100) having one or more processors and non-transitory memory (e.g., as described with the multifunction device 100 in FIG. 1). The non-transitory memory, e.g., 130, stores one or more programs to be executed by the one or more processing units 102. The one or more programs include instructions for process 200.

In this process 200, a newsfeed containing one or more stories is displayed 202 on touch sensitive screen. In some embodiments, the newsfeed is displayed on a non touch sensitive screen. In some embodiments, the newsfeed is received from a social networking system remotely located from the device. In some embodiments, the news stories include content posted by users of the social networking system and/or describe activities of users of the social networking system. In some embodiments, the news stories do not include or display the times the stories were posted. For example, a news story describing indicating a user's geographic location does not include the time the user posted the news story.

A contact (e.g., stylus or finger) is detected 204 with the touch sensitive screen. Movement of the contact on the touch-sensitive screen is detected 206. The movement is detected while the contact is maintained with the touch sensitive screen. Stated in another way, the movement is detected while the user maintains continuous contact with the touch sensitive screen. In some embodiments, movement of the contact in a substantially vertical direction is detected. For example, a user may perform an upward or downward swipe on the touch sensitive screen.

In response to detecting the movement of the contact, the newsfeed is scrolled 208. In some embodiments, the newsfeed is scrolled in the same direction as the movement of the contact. For example, if the contact moves in a downward direction, the newsfeed is scrolled in a downward direction. As the newsfeed is scrolled, stories that were not visible before the scrolling come into view on the touch-sensitive display.

In some embodiments, the newsfeed is scrolled response to a user initiated action. In one example, the newsfeed may be scrolled in response to a user performing a gesture on a touchpad. In another example, the newsfeed may be scrolled in response to a user selection of a button on the device or an input device. In another example, the newsfeed may be scrolled in response to a user selection of an option displayed on the screen using an input device (e.g., a mouse).

Figure 3A:
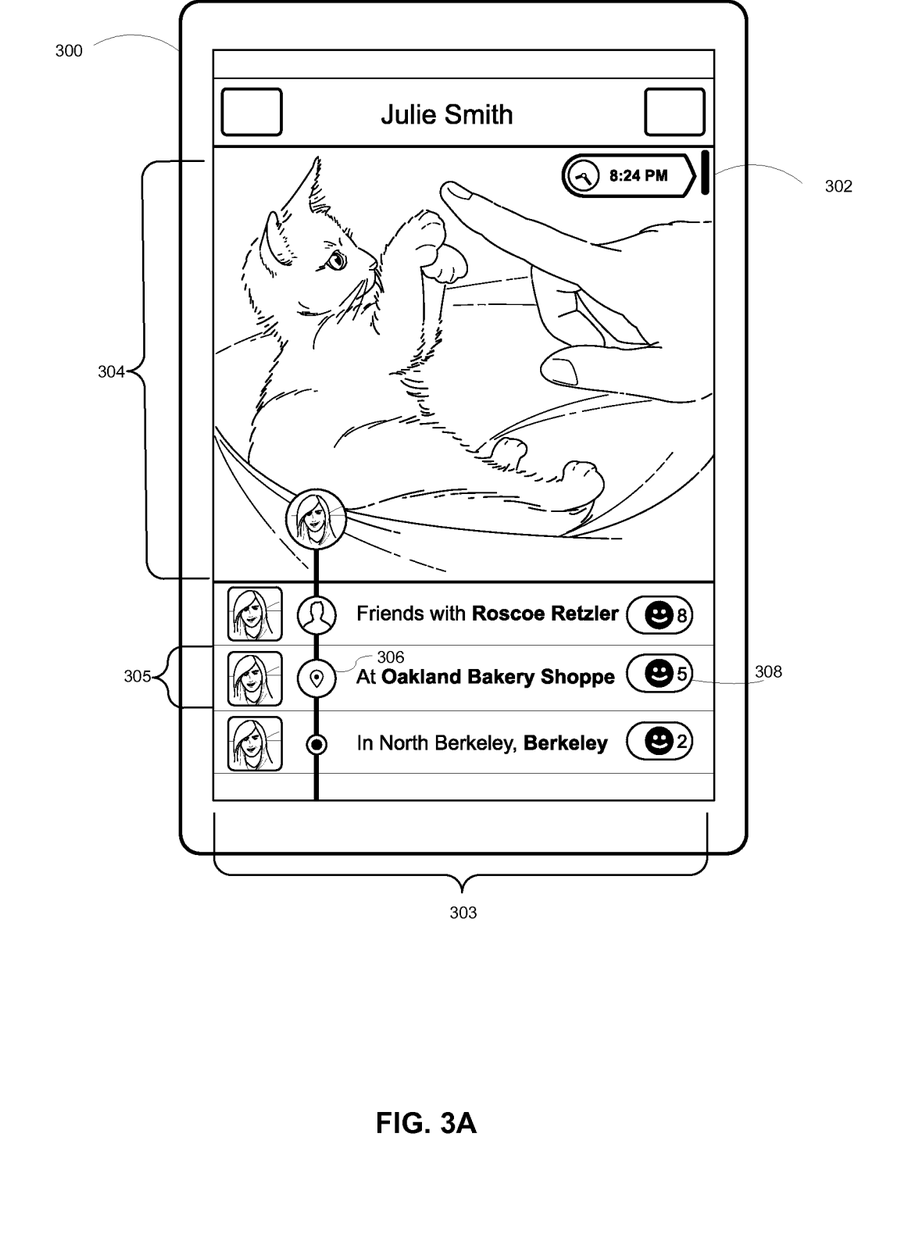
FIGS. 3A-3D illustrates examples of a scrolling news feed in accordance with some embodiments.

In some embodiments, the time icon is displayed 210 in response to detecting movement of the contact. In some embodiments, the time icon is displayed when the contact is detected with the touch sensitive screen. The time icon may be displayed along a side of the screen. For example, as shown in FIG. 3A, the time icon 302 may be displayed on the right side of the screen. The time icon 302 includes a time and/or date. The time and/or date displayed by the time icon 302 depends on where the time icon is displayed and what the time icon is displayed over. In some embodiments, when the time icon 302 is not displayed over a news story, the time icon 302 includes a current time and/or current date. The time icon 302 continues to be displayed as long contact is maintained with the touch sensitive screen.

Referring back to FIG. 2, the time icon 302 moves 212 in a substantially vertical direction while the newsfeed is scrolled. More specifically, the time icon 302 moves in a substantially vertical direction in response to movement of the contact in a substantially vertical direction. In some embodiments, the time icon 302 moves in accordance with the movement of the contact. In some embodiments, the time icon 302 moves in an opposite direction than the direction of the contact. For example, if the contact moves in an upward direction, the time icon moves in a downward direction. In some embodiments, the distance the time icon moves is proportional to the amount of the news feed that has been scrolled. For example, if 20% of the newsfeed has been scrolled, the time icon moves 20% down a side of the screen. In this way, the distance the time icon moves indicates to a user how much of a newsfeed they have scrolled. In some embodiments, the position of the time icon 302 along a side of the touch sensitive-screen indicates the amount that the newsfeed has been scrolled. Thus, the vertical position of the time icon 302 indicates the amount that the newsfeed has been scrolled. For example, when the time icon 302 is displayed at the halfway point of a side of the screen, half of the newsfeed has been scrolled and half of the newsfeed remains to be scrolled. When the last news story of the newsfeed is displayed, a request may be sent to the social networking system for additional news stories. After the additional news stories are received, the time icon 302 may be repositioned along the side of the screen to indicate the amount of the newsfeed that has been scrolled.

Figure 3B:
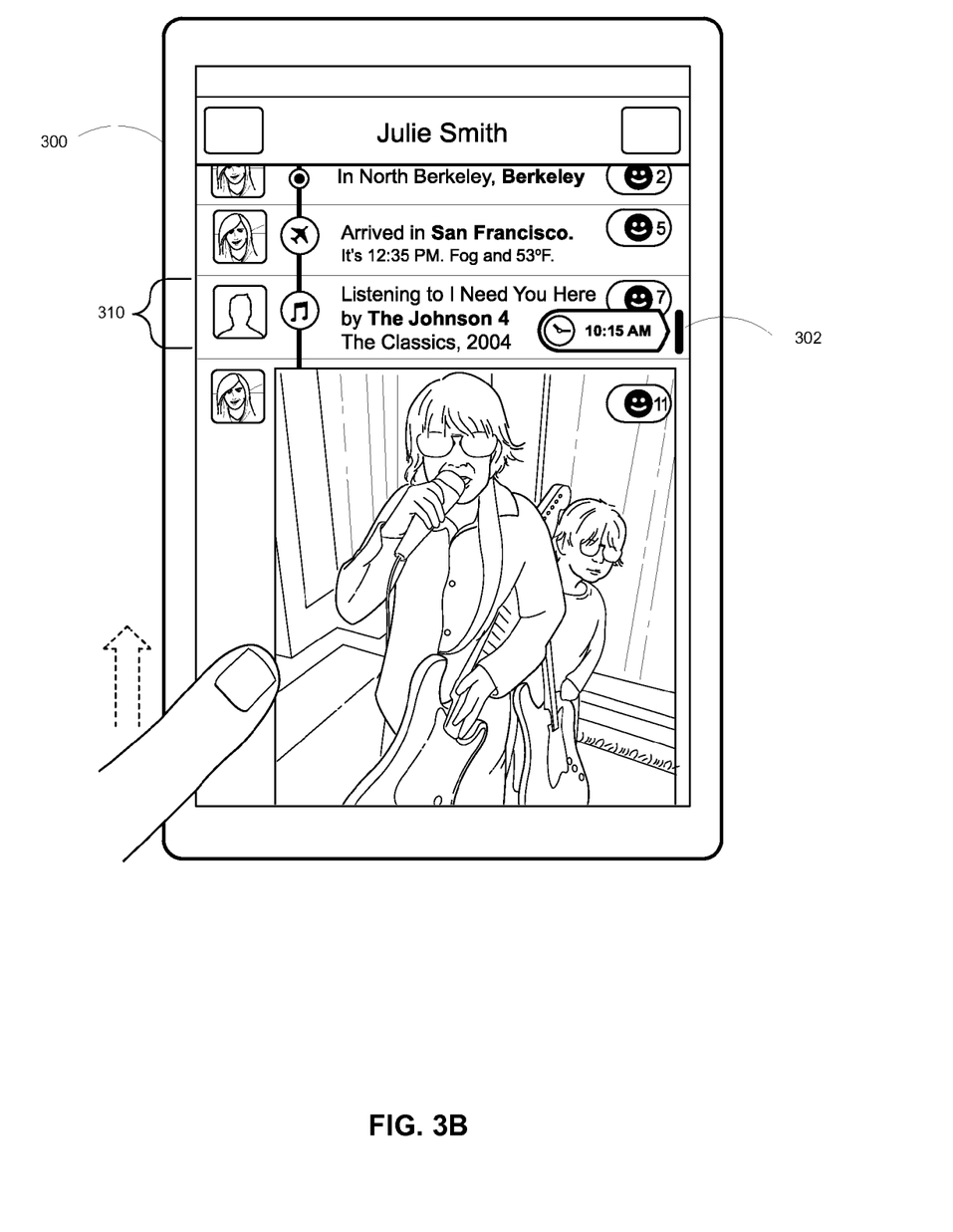

As the newsfeed is scrolled, the time icon 302 moves in a substantially vertical direction and is displayed over portions of the news stories in the newsfeed. The time icon 302 is displayed 214 over a portion of a first news story. When a predefined portion of the time icon is displayed over a respective news story, the time icon displays the time and/or date the respective news story was posted. In some embodiments, when at least half of the time icon 302 is displayed over a story, the clock displays the time and/or date of the story. For example, as shown in FIG. 3B, the time icon 302 displays the time (i.e., 10:15 am) that story 310 was posted. This way, as a user is scrolling the news feed, the user will be able to view the times respective news stories were posted. In some embodiments, when the time icon 302 is displayed over a story that was posted during the current day, the time icon 302 displays the time the story was posted but does not display the date the story was posted. In some embodiments, when the time icon 302 is displayed over a story that was posted a previous day, the time icon 302 may indicate that the story was posted yesterday. In some embodiments, when the time icon 302 is displayed over a story that was posted more than a day ago but within the current week, the time icon 302 may include a name of a day of the week. In some embodiments, when the time icon 302 is displayed over a story that was posted more than a week ago, the time icon 302 may include a date the story was posted. The time icon 302 displays a time and/or date for one news story at a time.

In some embodiments, the time icon 302 is displayed as long as the user maintains continuous contact with the touch sensitive display. For example, if the contact is a finger contact, once the user breaks contact with the screen, the time icon 302 ceases to be displayed. In some embodiments, the time icon 302 is display as long as the user maintains selection of a button on the device or an input device (e.g., touchpad or mouse button).

As described herein, the disclosed configurations advantageously provides a way to display times of news stories that uses a minimal amount of screen space, reduces the cognitive burden on a user, and produces a more efficient human-machine interface.

FIGS. 3A-3D illustrate an example of scrolling a newsfeed while displaying a time icon. FIG. 3A illustrates a screenshot of a user interface 300 in according to some embodiments. The user interface 300 displays a newsfeed 303 from a social networking system. The newsfeed 303 includes a cover photo 304 and news stories from a social networking system. A news story 305 includes a profile picture of the posting user, a story icon 306, content, and a number 308 indicating the amount of users who have viewed the story. The story icon 306 corresponds to the type of content in the story. More specifically, one of a plurality of story icons is displayed with a news story depending on the activity described in the content of the news story. In the example of FIG. 3A, the story icon 306 corresponds to stories indicating the geographic location of one or more users. A different story icon may be displayed to indicate that a story relates to two users becoming connected, to a user listening to music, to a user being at a location such as a restaurant or airport. The content of a news story describes activities of users of the social networking system. In some embodiments, the content provided by a user of the social networking system. For example, a user may provide a status update, photo or video.

In FIG. 3A, the user interface 300 includes a time icon 302 that is displayed over a portion of the cover photo 304. The time icon 302 includes a current time and an image of a clock that includes a clock face and clock hands. The time icon 302 displays a current time when at least half of the time icon 302 is display over the cover photo. The clock hands are in positions corresponding to the current time. In some embodiments, the time icon 302 is displayed at the top of a side of the screen to indicate that the interface 300 currently displays the beginning of the newsfeed 303. As discussed above, the vertical position of the time icon 302 indicates the amount of the newsfeed that has been scrolled and the amount of the newsfeed that has yet to be scrolled.

FIG. 3B shows the user interface 300 after a user performs a gesture on the touch sensitive screen to scroll the newsfeed 303. As shown in FIG. 3B, in response to the gesture, news stories (e.g., 310) that were not previously visible are now displayed on the screen. While the newsfeed 303 is scrolled, the time icon 302 moves in a vertical direction. In the example of FIG. 3B, the time icon 302 moved in a downward direction along the right edge of the screen. In some embodiments, when more than half of the time icon 302 is displayed over a news story, the time icon 302 displays the post time of the news story. In some embodiments, when more than half the time icon 302 is displayed over a news story that was posted within the current day, the time icon 302 displays a time but not a date. This way, a user is not provided with unnecessary information. The distance the time icon 302 is moved from the upper portion the interface is proportional to the amount of the newsfeed that is scrolled. For example, if the 20% of the newsfeed is scrolled, the time icon 302 is moved to a position that corresponds to 20% of the vertical length of the portion of the screen that displays the newsfeed.

Figure 3C:
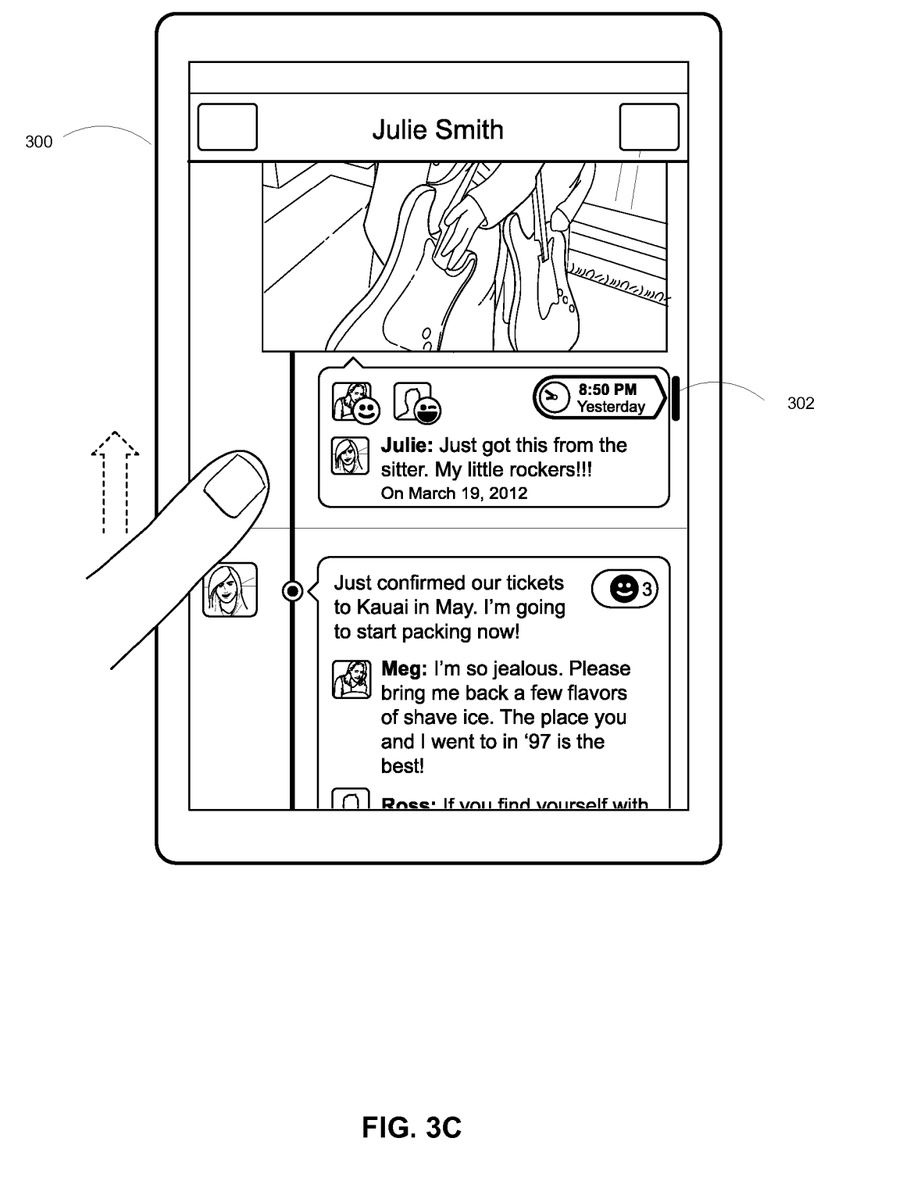

FIG. 3C shows the user interface 300 after the screen shown in FIG. 3B is further scrolled. In some embodiments, when more than half of the time icon 302 is displayed over a news story that was posted the previous day, the time icon 302 includes the time the news story was posted and includes an identifier for the previous day (i.e., "yesterday").

Figure 3D:
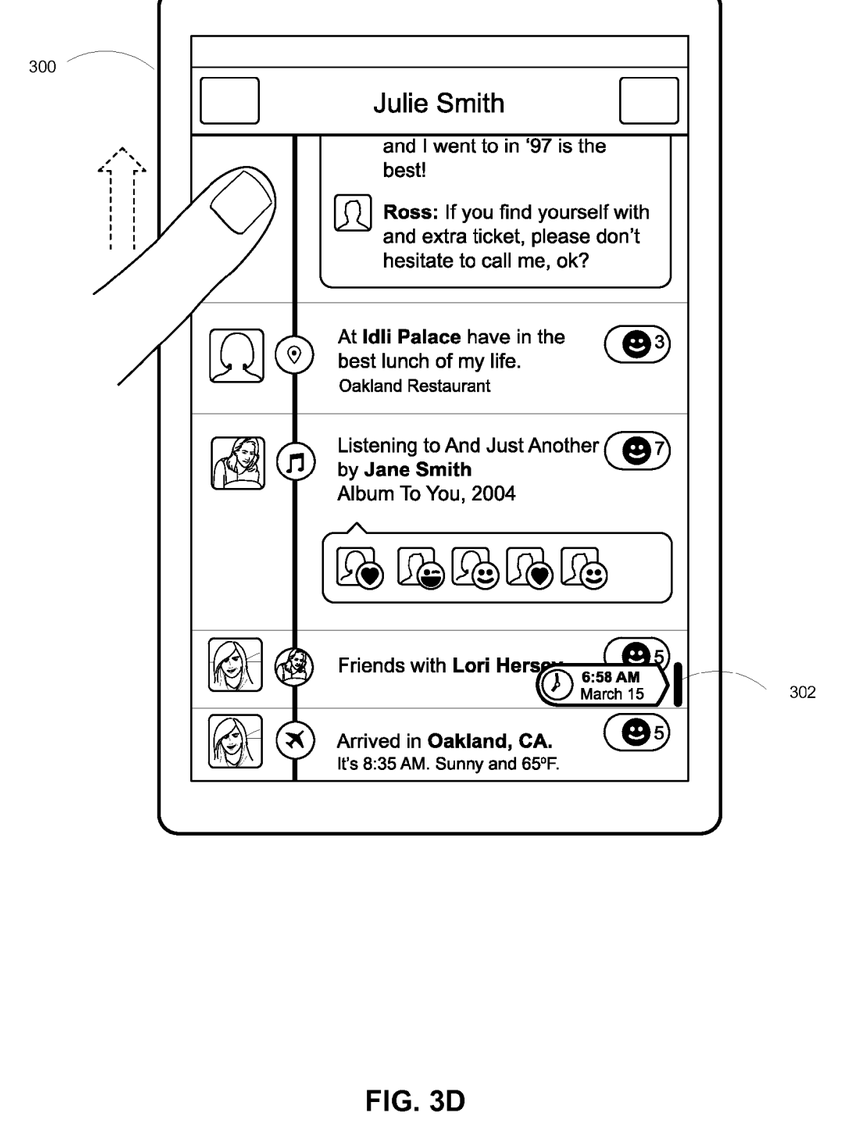

FIG. 3D shows the user interface 300 after the screen shown in FIG. 3C is further scrolled. In some embodiments, when more than half of the time icon 302 is displayed over a news story that was posted more than a week ago from the current date, the time icon 302 includes the date the news story was posted. For example, as shown in FIG. 3D, the clock 302 icon includes the date (i.e., March 15) story 320 was posted.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as described with FIGS. 1 and/or 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a menu icon through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method, comprising:
   displaying a feed on a touch-sensitive screen of a computing device, the feed including a plurality of stories from a social networking system;
   detecting a contact with the touch-sensitive screen;
   in response to detecting movement of the contact:
   scrolling the feed on the touch-sensitive screen, and while the feed is scrolled:
   displaying a time icon;
   determining whether the time icon is displayed over at least a portion of a first story of the feed;
   updating, responsive to a determination that the time icon is displayed over at least a portion of the first story of the feed, the time icon to display a time the first story was posted to the social networking system;
   moving the time icon based on the scrolling of the feed;
   determining whether the time icon is moved over at least a portion of a second story of the feed; and
   updating, responsive to a determination that the time icon is moved over at least a portion of the second story of the feed, the time icon to display a time the second story was posted to the social networking system.

2. The method of claim 1, wherein the plurality of stories describe activities of users of the social networking system.

3. The method of claim 1, wherein the plurality of stories include content posted by users of the social networking system.

4. The method of claim 1, wherein determining whether the time icon is displayed over at least a portion of a first story of the feed comprises determining whether at least half the time icon is displayed over the first story.

5. The method of claim 1, further comprising:
   detecting a break of the contact with the touch-sensitive screen; and
   in response to detecting the break, ceasing to display the time icon.

6. The method of claim 1, wherein:
   the time icon includes an image of an analog clock having a clock face and clock hands, the clock hands displayed at positions corresponding to the time the first story was posted to the social networking system; and
   in response to displaying the time icon over at least the portion of the second story, animating a display of the analog clock, the animation displaying movement of the clocks hands to new positions corresponding to the time the second story was posted to the social networking system.

7. The method of claim 1, wherein the time icon further includes a date of when a respective story was posted to the social networking system.

8. The method of claim 1, wherein the time icon further includes a date of when a respective story was posted to the social networking system when the respective story was posted more than a week prior to a current date.

9. The method of claim 1, wherein the time icon is displayed along a side of the touch-sensitive screen.

10. The method of claim 1, wherein the time icon is displayed at a distance from a border of the touch-sensitive screen that corresponds to an amount the feed has been scrolled.

11. The method of claim 1, wherein movement of the time icon corresponds to an amount the feed is scrolled.

12. A non-transitory computer readable storage medium storing one or more programs configured to be executed by a computing device with a touch-sensitive screen, the one or more programs comprising instructions for:
- displaying a feed on the touch-sensitive screen, the feed including a plurality of stories from a social networking system;
- detecting a contact with the touch-sensitive screen;
- in response to detecting movement of the contact:
  - scrolling the feed on the touch-sensitive screen, and while the feed is scrolled:
    - displaying a time icon over at least a portion of a first story of the feed, the time icon displaying a time the first story was posted to the social networking system;
    - moving the time icon based on the scrolling of the feed; and
    - updating, responsive to moving the time icon over at least a portion of a second story of the feed, the time icon to display a time the second story was posted to the social networking system.

13. The non-transitory computer readable storage medium of claim 12, wherein the first story describes an activity of a user of the social networking system.

14. The non-transitory computer readable storage medium of claim 12, wherein the plurality of stories include content posted by users of the social networking system.

15. A computer implemented method, comprising:
- displaying a feed on a screen of a computing device, the feed including a plurality of stories from a social networking system;
- responsive to a user initiated action, scrolling the feed on the screen, and while the feed is scrolled:
  - displaying a time icon over at least a portion of a first story of the feed, the time icon displaying a time the first story was posted to the social networking system;
  - moving the time icon based on the scrolling of the feed; and
  - updating, responsive to moving the time icon over at least a portion of a second story of the feed, the time icon to display a time the second story was posted to the social networking system.

16. The method of claim 15, wherein the first story describes an activity of a user of the social networking system.

17. The method of claim 15, wherein the plurality of stories include content posted by users of the social networking system.

18. A non-transitory computer readable storage medium storing one or more programs configured to be executed by a computing device with a screen, the one or more programs comprising instructions for:
- displaying a feed on a screen of a computing device, the feed including a plurality of stories from a social networking system;
- responsive to a user initiated action, scrolling the feed on the screen, and while the feed is scrolled:
  - displaying a time icon over at least a portion of a first story of the feed, the time icon displaying a time the first story was posted to the social networking system;
  - moving the time icon based on the scrolling of the feed; and
  - updating, responsive to moving the time icon over at least a portion of a second story of the feed, the time icon to display a time the second story was posted to the social networking system.

19. The non-transitory computer readable storage medium of claim 18, wherein the first story describes an activity of a user of the social networking system.

20. The non-transitory computer readable storage medium of claim 18, wherein the plurality of stories include content posted by users of the social networking system.

* * * * *